(12) United States Patent
Helton

(10) Patent No.: US 9,313,862 B1
(45) Date of Patent: Apr. 12, 2016

(54) SELF-DIMMING VEHICLE HEADLIGHTS

(71) Applicant: Levi G. Helton, Salt Lick, KY (US)

(72) Inventor: Levi G. Helton, Salt Lick, KY (US)

(*) Notice: Subject to any disclaimer, the term of this patent is extended or adjusted under 35 U.S.C. 154(b) by 715 days.

(21) Appl. No.: 13/628,869

(22) Filed: Sep. 27, 2012

Related U.S. Application Data

(60) Provisional application No. 61/539,721, filed on Sep. 27, 2011.

(51) Int. Cl.
  *B60Q 1/02* (2006.01)
  *H05B 37/02* (2006.01)
  *B60Q 1/14* (2006.01)

(52) U.S. Cl.
  CPC .......... *H05B 37/0272* (2013.01); *B60Q 1/1423* (2013.01); *B60Q 2300/41* (2013.01); *B60Q 2300/42* (2013.01)

(58) Field of Classification Search
  USPC .............. 315/82–83; 340/901–904, 942, 439, 340/435, 436, 109, 169, 174, 425.5
  See application file for complete search history.

(56) References Cited

U.S. PATENT DOCUMENTS

| | | | |
|---|---|---|---|
| 2,737,599 A | 3/1956 | Goldsmith et al. | |
| 2,959,709 A | 11/1960 | Vanaman et al. | |
| 3,177,397 A | 4/1965 | Keeran | |
| 4,236,099 A | 11/1980 | Rosenblum | |
| 5,086,253 A | 2/1992 | Lawler | |
| 5,634,209 A * | 5/1997 | Prudhomme et al. | 455/345 |
| 5,909,172 A * | 6/1999 | Ashford | 340/458 |
| 6,151,539 A * | 11/2000 | Bergholz et al. | 701/25 |
| 6,611,610 B1 | 8/2003 | Stam et al. | |
| 6,768,944 B2 | 7/2004 | Breed et al. | |
| 7,005,977 B1 * | 2/2006 | Tengler et al. | 340/457.2 |
| 7,613,327 B2 | 11/2009 | Stam et al. | |
| 2010/0123395 A1 * | 5/2010 | Ahn et al. | 315/82 |

OTHER PUBLICATIONS 3M 956 Bondo Double Handle Locking Suction Cup by Dent Puller. Amazon.com http://www.amazon.com/3M-956-Double-Locking-Suction/dp/B000KXA6HY.

* cited by examiner

*Primary Examiner* — Douglas W Owens
*Assistant Examiner* — James H Cho
(74) *Attorney, Agent, or Firm* — Robert C. Montgomery; Montgomery Patent & Design LP

(57) ABSTRACT

A system by which high beam lights on motor vehicles are automatically dimmed when a similarly equipped vehicle is approaching from an oncoming direction utilizes transmitted radio frequency (RF) signals between vehicles which operate at a preset range. Vehicles equipped with the system also comprise front, rear, and side vehicle sensors to differentiate RF signals transmitted from oncoming or trailing vehicles. A receiving antenna portion of the system picks up an RF signal, verifies there are no proximal side or trailing vehicles, and deactivates the high beam circuit for a preset period of time. All vehicles equipped with the system provide an RF signal having a digital identification code to prevent interference. The system is preferably introduced as a retrofit kit for installation upon existing vehicles; however, the system may also be incorporated on new vehicles.

16 Claims, 3 Drawing Sheets

SELF-DIMMING VEHICLE HEADLIGHTS

RELATED APPLICATIONS

The present invention was first described in and claims the benefit of U.S. Provisional Application No. 61/539,721, filed Sep. 27, 2011, the entire disclosures of which are incorporated herein by reference.

FIELD OF THE INVENTION

The presently disclosed subject matter generally a system by which a first vehicle has their high beam headlights automatically dimmed via a dimming system integrated into the first vehicle upon being in close proximity with a second vehicle having the system integrated therein.

BACKGROUND OF THE INVENTION

The invention described herein pertains to self-dimming headlights, and more particularly to a radiofrequency (RF) modulator in conjunction with a relay switch for dimming headlights. Almost everyone who drives at night has at one time or another experienced the discomfort of oncoming traffic forgetting to turn off their high beams. Not only can the bright lights cause discomfort, but they can be distracting and even dangerous when the road becomes difficult to see. Additionally, short of flashing their own lights there is little a person can do to warn someone that their high beams are on. While multiple attempts have been made to automatically dim headlights when oncoming traffic is detected, there is a failure to anticipate oncoming traffic in the art.

An early attempt at developing automatically dimming headlights is seen in U.S. Pat. No. 2,737,599 to Harold A. Goldsmith which describes a photosensitive device connected in series with a vehicle's headlights. When the lights from an oncoming vehicle shine on the photosensitive device the conductive properties of the circuit are affected, leading to a dimming of the lights. While the patent describes a method for automatically dimming headlights, it fails to anticipate vehicles without headlights shining directly on the photosensitive device. U.S. Pat. No. 2,959,709 to Charles H. Odom discloses an improved light sensitive device for automatically dimming headlights. The primary object of the '709 patent is to prevent dimming in response to objects on one side of the vehicle, such as illuminated store windows or street lights. This is accomplished through the use of a photosensitive device which detects the direction of light entering the sensor. Similar to the '599 patent, there is no anticipation of oncoming traffic prior to light shining on the photosensitive device.

Another attempt to effectively develop automatically dimming headlights can be seen in U.S. Pat. No. 7,613,327 to Joseph S. Stam et al. The apparatus disclosed in the '327 patent utilizes an ambient light sensor to determine the need for headlights along with an image sensor to determine whether vehicles are in close proximity. The use of an image sensor allows for automatic dimming when there are no oncoming headlights to trigger a photosensitive device. This is useful for situations where high beams are not desired, but there are no direct light sources to trigger dimming, such as when one car is following another. As with the previously mentioned patents, there is no anticipation of oncoming traffic, only an ability to dim the headlights when in close proximity to another vehicle or after oncoming traffic lights are already shining directly at the device.

Although the various devices observed may fulfill their individual, particular objectives, each device suffers from one (1) or more disadvantage or deficiency related to design or function. Whether taken singly, or in combination, none of the observed devices disclose the specific arrangement and construction of the instant invention.

SUMMARY OF THE INVENTION

The inventor has recognized the deficiencies in the art pertaining to automatically dimming vehicle headlights. Furthermore, the inventor has observed that there is a need for the ability to anticipate oncoming traffic and warn approaching vehicles of a drivers own presence prior to the detection of oncoming headlights.

The inventor has addressed at least one (1) of the problems observed in the art by developing a novel apparatus for dimming a vehicles headlights in response to approaching traffic while at the same time warning others of a vehicles approach. It is a feature and aspect of the present invention to provide a radio frequency (RF) system for self-dimming vehicle headlights. According to a preferred embodiment, an electronic control module is integrated into an existing high beam light dimming portion of a vehicle's wiring harness. The control module works in conjunction with an RF antenna and an internal RF transceiver for receiving and transmitting RF signals, respectively.

It is another aspect of the invention to provide an RF antenna having a uni-directional means of transmitting a first RF signal. Said RF antenna is able to transmit an RF signal over a range of approximately one-half mile (½ mi.). The antenna is also capable of receiving second RF signals from oncoming vehicles and/or third RF signals from proximal vehicles not approaching head-on. Each RF signal transmitted has a uniquely encoded digital identification code to prevent interference.

It is yet another aspect of the invention to provide a front sensor, a rear sensor, and at least two (2) side sensors. Each sensor utilizes transmitting technology to detect the presence of proximal vehicles. Additionally, an ON/OFF switch to defeat the automatic high beam light dimming function of the system is provided. In the preferred embodiment, the ON/OFF switch comprises a two-position switching component mounted within the primary vehicle.

The RF antenna continuously transmits a first RF signal which is received by a similarly equipped oncoming vehicle and/or proximal vehicle. Upon receiving a second RF signal from an oncoming vehicle, the control module will deactivate the primary vehicle's high beam circuit, provided that no proximal vehicle is detected via the rear sensor or two (2) side sensors.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawing and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
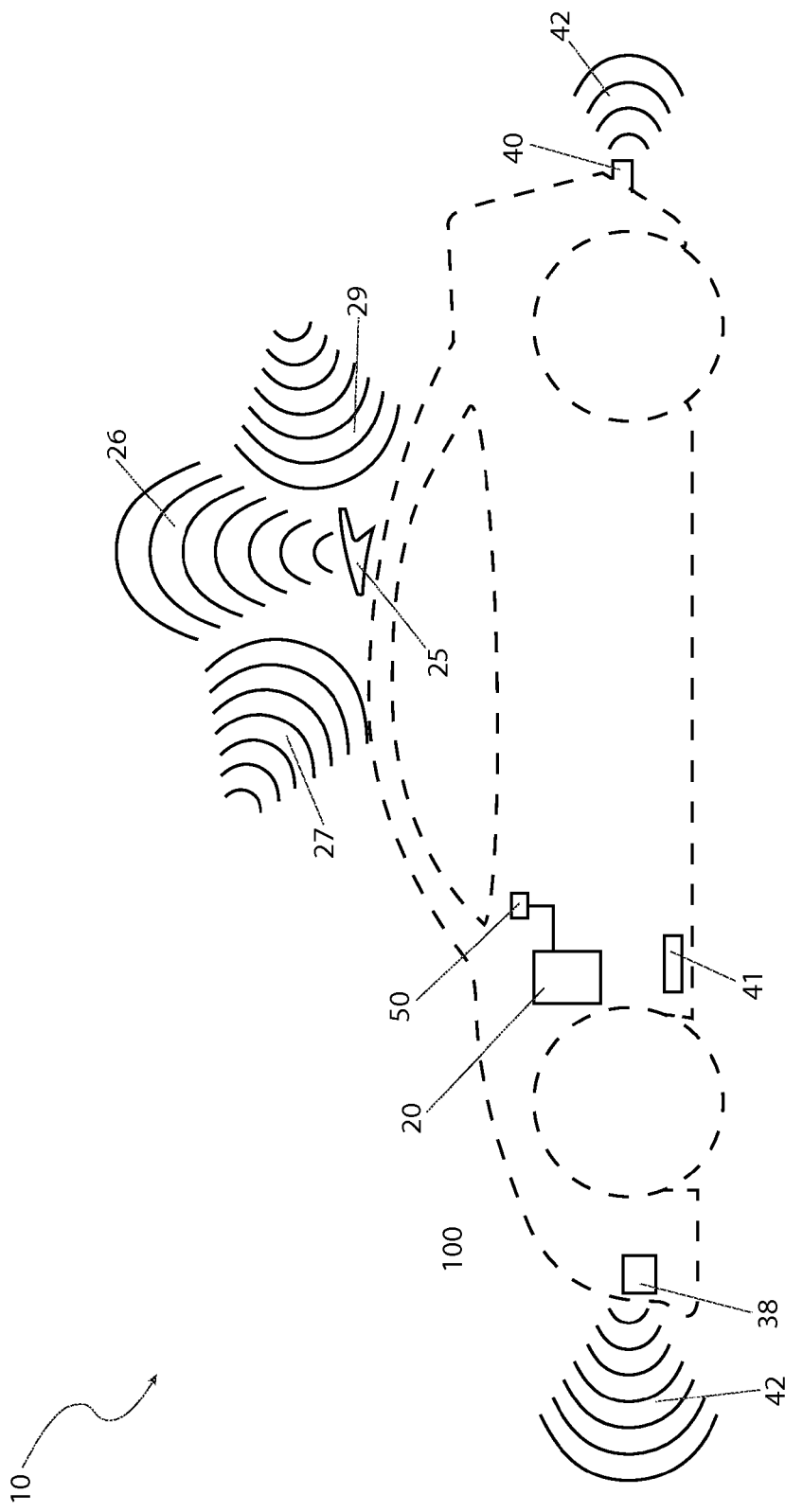
FIG. 1 is a side perspective view of a primary vehicle 100 equipped with self-dimming vehicle headlights 10, according to a preferred embodiment of the present invention.

DESCRIPTIVE KEY 10 self-dimming vehicle headlights
20 control module
22 control connection
23 direct current (DC) power connection
24 radio frequency (RF) transceiver
25 RF antenna
26 first RF signal
27 second RF signal
29 third RF signal
38 front sensor
40 rear sensor
41 side sensor
42 sensor signal
50 ON/OFF switch
100 primary vehicle
102 existing wire harness
110 oncoming vehicle
115 high beam light
120 proximal vehicle

DETAILED DESCRIPTION OF THE PREFERRED EMBODIMENT

Figure 2:
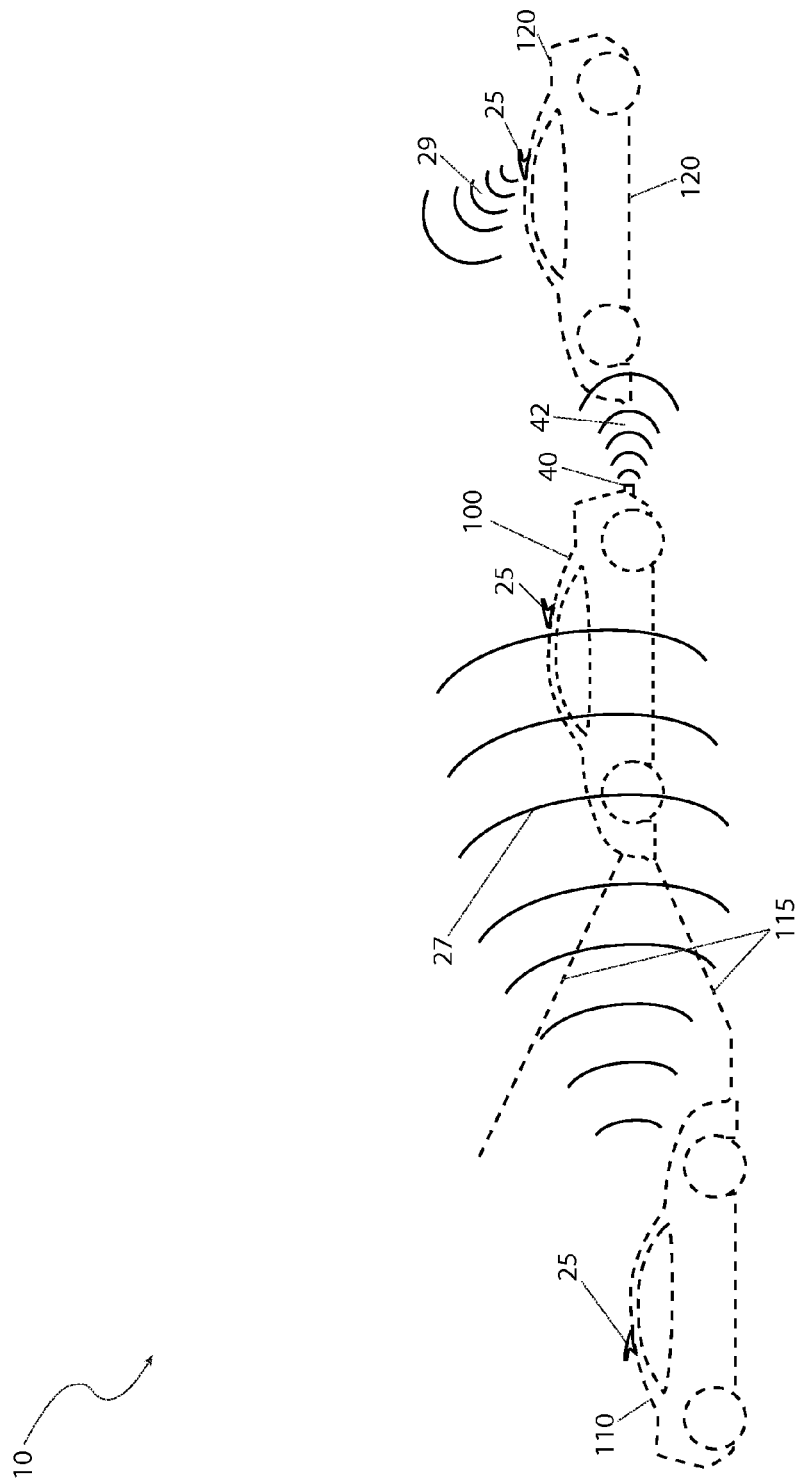
FIG. 2 is an environmental view of the self-dimming vehicle headlights 10 depicting operation of the invention between a plurality of vehicles 100, 110, 120, according to a preferred embodiment of the present invention; and, FIG. 3 is an electrical block diagram of the self-dimming vehicle headlights 10, according to a preferred embodiment of the present invention.
Figure 3:
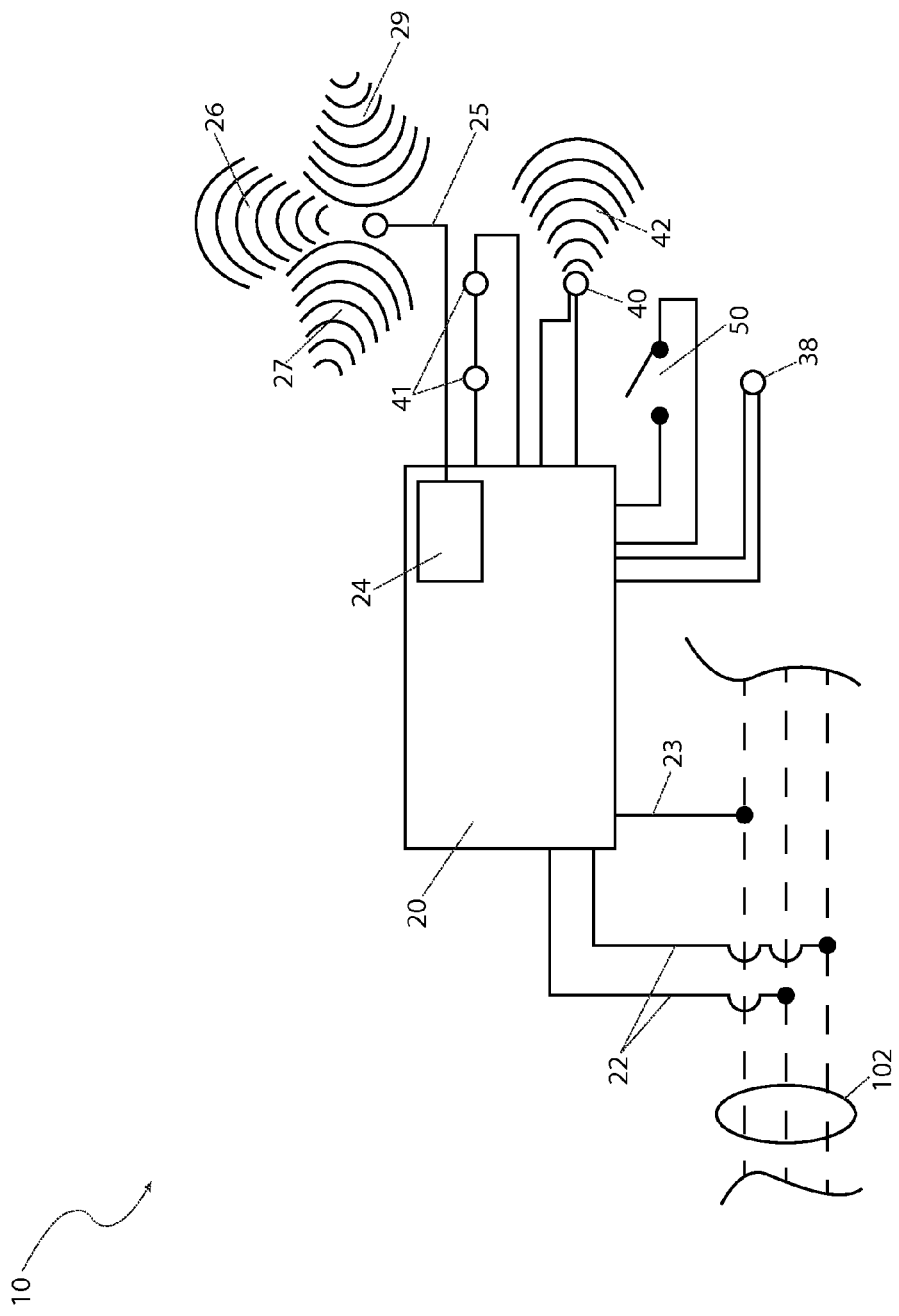

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIGS. 1 and 2, side perspective and environmental views of vehicles 100, 110, 120 being equipped with or detected by the self-dimming vehicle headlights (herein described as the "system") 10, according to a preferred embodiment of the present invention, are disclosed. The system 10 provides a means by which high beam lights 115 on an existing primary motor vehicle 100 are automatically dimmed when a similarly equipped oncoming vehicle 110 is in close proximity using RF signals 26, 27, 29 being transmitted and received between the vehicles 100, 110. The system 10 is envisioned to be introduced as a retrofit kit for installation upon an existing primary vehicle 100.

The system 10 comprises an electronic control module 20 being retrofitted within an existing primary vehicle 100 and integrated into an existing high beam light 115 dimming portion of a wiring harness 102. The control module 20 provides power to an internal RF transceiver 24 which in turn works in conjunction with a RF antenna 25 jointly providing a capability of receiving and transmitting RF signals 26, 27, 29 over an approximate range of one-half mile (½ mi.). The antenna 25 may utilize a uni-directional (focused) means of transmitting a first RF signal 26 based upon performance characteristics which may use signal focusing methods such as, but not limited to: copper shielding or the like, thereby reducing an occurrence of RF signal bouncing or echoing. The antenna 25 preferably comprises a magnetic-type-base capable of attachment to roof, trunk, and other metallic surfaces upon or within the vehicle 100. During normal operation, said RF antenna 25 continuously transmits a first RF signal 26 which is in turn received by a similarly equipped oncoming vehicle 100 and/or proximal vehicle 120. Furthermore, said RF antenna 25 receives second RF signals 27 from oncoming vehicles 110 and/or third RF signals 29 from proximal vehicles 120 being positioned behind or beside the primary vehicle 100. The system 10 further comprises a front sensor 38, a rear sensor 40, and at least two (2) side sensors 41, each being capable of detecting the presence of proximal vehicles 120, respectively. Said sensors 38, 40, 41 preferably use microwave or equivalent transmitting technology. Upon receiving a second RF signal 27 from an oncoming vehicle 110, the control module 20 will deactivate the existing primary vehicle's 100 high beam circuit upon verification that no proximal vehicle 120 is detected via the rear and side sensors 40, 41. The primary 100 and oncoming 110 vehicles are to be similarly equipped with the system 10 and each respective RF signal being transmitted having a uniquely encoded digital identification code to prevent interference.

The control module 20 is in electrical communication with a dash-mounted ON/OFF switch 50 which provides an operator a means of defeating the automatic high beam light 115 dimming function of the system 10 during times when it is not needed or not desired. Said ON/OFF switch 50 is envisioned to be a common two-position switching component envisioned to be mounted to a dashboard portion of the primary vehicle 100 and being convenient to a driver's reach, or may be integrated into existing control components present upon the dashboard surface of the primary vehicle 100.

The system 10 is envisioned to be introduced as a retrofit kit for installation on an existing vehicle 100; however, to those skilled in the art, the teachings of the system 10 may also be incorporated into new vehicles as an OEM product, and as such should not be interpreted as a limiting factor of the system 10.

Referring now to FIG. 3, an electrical block diagram of the system 10, according to a preferred embodiment of the present invention, is disclosed. The control module portion 20 of the system 10 comprises a standard "black-box" enclosure which provides protective containment of electrical and electronic equipment necessary to the operation of the system 10 including components such as, but not limited to: printed circuit boards, microprocessors, embedded software, relays, microwave signal generation and processing equipment, and the like. The control module 20 is to be integrated into particular circuits of the existing wiring harness 102 of the existing primary vehicle 100 including a 12-volt DC power connection 23 and a plurality of control connections 22 to associated circuits using common copper conductors. Said DC power connection 23 and control connections 22 are envisioned to be color-coded so as to be easily matched up to corresponding wiring portions in the existing wiring harness 102. Said connections 22, 23 allow the system 10 to interrupt the existing high beam light 115 dimming circuitry.

Said control module 20 further comprises an internal RF transceiver 24 being capable of receiving and transmitting RF signals 26, 27, 29 over a range of approximately one-half mile (½ mi.) via the RF antenna 25. Said control module 20 further comprises an internal software timer function which provides a pre-determined period of time, envisioned to be approximately thirty seconds (30 s.), in which the high beam lights 115 of the primary vehicle 100 are dimmed once acted upon by the system 10.

Said control module 20 further provides power and control to the front 38, rear 40, and side 41 sensors. Said sensors 38, 40, 41 preferably comprise microwave devices envisioned to operate at frequencies such as 10 GHz, 25 GHz, and sweepable 10 GHz to 30 GHz, and are envisioned to provide a broad beam width in a horizontal plane capable of covering three (3) lanes. It is understood that said sensors 38, 40, 41 may utilize additional technologies with equal benefit such as pulsed, coded spread spectrum, TDMA (Time Division Multiple Access), CDMA (Code Division Multiple Access), FDMA (Frequency Division Multiple Access), and the like, and as such should not be interpreted as a limiting factor of the system 10. Said sensors 38, 40, 41 work in conjunction with signal processing hardware and software within the control module 20 to detect the presence of trailing or side located proximal vehicles 120.

It is understood that additional electrical connections, fuses, and the like may be necessary to accomplish an installation of the system 10 based upon particular primary vehicle 100 applications and as such should not be interpreted as a limiting factor of the system 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, the system 10 would be installed within a primary vehicle 100 by a qualified automotive technician as indicated in FIG. 1.

The method of installing and utilizing the system 10 may be achieved by performing the following steps: procuring the system 10; mounting the control module 20 under a dashboard area or under a hood area at a position convenient to the existing wiring harness 102, based upon a particular vehicle installation; connecting all control connections 22 and the DC power connection 23 portions of the control module 20 to said existing wiring harness 102 in accordance with provided instructions; mounting and routing respective wiring portions to the antenna 25, front sensor 38, rear sensor 40, side sensors 41, and ON/OFF switch 50 portions being located at desired positions of a roof, rear bumper, side surface, and dashboard portion of the primary vehicle 100; operating the primary vehicle 100 in a normal manner; activating the system 10 by selecting "ON" upon the ON/OFF switch 50; initiating transmission of the first RF signal 26 via the RF antenna 25; allowing said antenna 25 to receive a second RF signal 27 from an oncoming vehicle 110; conducting said second RF signal 27 to the control module 20 via the control connection 22; allowing said control module 20 to energize the front 38, rear 40, and side 41 sensors to transmit respective sensor signals 42 so as to detect any trailing or side positioned proximal vehicles 120; automatically dimming the high beam lights 115 of the primary vehicle 100 for a pre-determined duration of approximately thirty seconds (30 s.) upon verification of no proximal vehicles 120; and, benefiting from reduction or elimination of temporary blindness of operators of oncoming vehicles 110 due to high beam lights 115 while utilizing the system 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A self-dimming vehicle headlight system, comprising:
    an electronic control module adapted to be in electrical communication with a high beam light dimming portion of a wiring harness of a vehicle;
    an internal transceiver in electrical communication with said electronic control module;
    an antenna in electrical communication with said internal transceiver adapted to be removably mounted to said vehicle;
    a front sensor in electrical communication with said electronic control module adapted to be mounted to a front of said vehicle;
    at least one side sensor in electrical communication with said electronic control module adapted to be mounted to either side of said vehicle; and,
    a rear sensor in electrical communication with said electronic control module adapted to be mounted to a rear of said vehicle;
    wherein said internal transceiver continuously transmits a signal through said antenna;
    wherein said internal transceiver receives and transmits said signal as an RF signal over an approximate range of one-half mile; and,
    wherein a high beam headlight of a first vehicle equipped with said system is automatically dimmed when said internal transceiver receives a signal from a second vehicle equipped with said system and said rear and said at least one side sensor of said first vehicle do not detect a proximal vehicle.

2. The system of claim 1, wherein said antenna comprises a magnetic base.

3. The system of claim 1, wherein said antenna utilizes a uni-directional means of transmitting said signal.

4. The system of claim 1, wherein said RF signal has a uniquely encoded digital identification code.

5. The system of claim 1, wherein said front sensor, said at least one side sensor, and said rear sensor are each a microwave device.

6. The system of claim 1, further comprising a power switch in electrical communication with said electronic control module adapted to be mounted to a dashboard of said vehicle.

7. The system of claim 1, wherein said electronic control module dims said high beam headlights for a pre-determined period of time.

8. The system of claim 7, wherein said pre-determined period of time is approximately thirty seconds.

9. A vehicle having a self-dimming vehicle headlight system, comprising:
- an electronic control module in electrical communication with a high beam light dimming portion of a wiring harness of a vehicle;
- an internal transceiver in electrical communication with said electronic control module;
- an antenna in electrical communication with said internal transceiver removably mounted to said vehicle;
- a front sensor in electrical communication with said electronic control module mounted to a front of said vehicle;
- at least one side sensor in electrical communication with said electronic control module mounted to either side of said vehicle; and,
- a rear sensor in electrical communication with said electronic control module mounted to a rear of said vehicle;
- wherein said internal transceiver continuously transmits a signal through said antenna;
- wherein said internal transceiver receives and transmits said signal as an RF signal over an approximate range of one-half mile; and,
- wherein a high beam headlight of a first vehicle equipped with said system is automatically dimmed when said internal transceiver receives a signal from a second vehicle equipped with said system and said rear and said at least one side sensor of said first vehicle do not detect a proximal vehicle.

10. The system of claim 9, wherein said antenna comprises a magnetic base.

11. The system of claim 9, wherein said antenna utilizes a uni-directional means of transmitting said signal.

12. The system of claim 9, wherein said RF signal has a uniquely encoded digital identification code.

13. The system of claim 9, wherein said front sensor, said at least one side sensor, and said rear sensor are each a microwave device.

14. The system of claim 9, further comprising a power switch in electrical communication with said electronic control module adapted to be mounted to a dashboard of said vehicle.

15. The system of claim 9, wherein said electronic control module dims said high beam headlights for a pre-determined period of time.

16. The system of claim 15, wherein said pre-determined period of time is approximately thirty seconds.

* * * * *